US009850080B1

(12) United States Patent
Dal Dosso et al.

(10) Patent No.: US 9,850,080 B1
(45) Date of Patent: Dec. 26, 2017

(54) LOAD HANDLER FOR LOADING AND UNLOADING TALL RESILIENT UNITARY LOADS IN HEIGHT-RESTRICTING CONTAINERS

(71) Applicant: Cascade Corporation, Fairview, OR (US)

(72) Inventors: Andrea Dal Dosso, Verona (IT); Angelo Gambaretto, Ilarione (IT)

(73) Assignee: Cascade Corporation, Fairview, OR (US)

( * ) Notice: Subject to any disclaimer, the term of this patent is extended or adjusted under 35 U.S.C. 154(b) by 0 days.

(21) Appl. No.: 15/595,614

(22) Filed: May 15, 2017

(51) Int. Cl.
*B65G 67/02* (2006.01)
*B65G 67/24* (2006.01)
*B65G 7/12* (2006.01)

(52) U.S. Cl.
CPC ............... *B65G 67/02* (2013.01); *B65G 7/12* (2013.01); *B65G 67/24* (2013.01); *B65G 2201/0214* (2013.01); *B65G 2201/0223* (2013.01)

(58) Field of Classification Search
CPC .......... B65G 7/12; B65G 67/02; B65G 67/24; B65G 2201/0214; B65G 2201/0223; B65G 2201/0273; B25J 15/0004; B25J 15/0253; B66F 9/122; B66F 9/183; B66C 1/58
USPC ................. 294/86.4, 103.1, 119.1, 197, 207; 414/426, 429, 621, 910, 911; 53/529
See application file for complete search history.

(56) References Cited

U.S. PATENT DOCUMENTS 2,647,650 A * 8/1953 Sherriff ................... B66F 9/184 294/207
3,858,735 A * 1/1975 Zrostlik .................. B60C 25/00 294/119.1
3,927,778 A * 12/1975 Zrostlik .................. B60C 25/00 294/119.1
4,051,966 A * 10/1977 Cotton .................... B66F 9/183 294/119.1
4,305,692 A * 12/1981 Brauer ................... B22D 33/00 164/137
4,777,781 A 10/1988 Doster et al.
4,920,729 A 5/1990 Doster et al.
5,186,515 A * 2/1993 Goldberg .............. B25B 1/2405 269/264
5,340,268 A 8/1994 Dowty
5,391,050 A * 2/1995 Gatteschi .............. B65B 43/126 294/119.1
5,544,578 A 8/1996 Keller et al.
5,807,053 A * 9/1998 Pride .................... A01D 87/127 414/24.5
6,082,797 A * 7/2000 Antonette ................ B25J 9/104 294/103.1
6,312,206 B1 11/2001 Pylate et al.
6,432,718 B1 8/2002 Umezawa et al.
6,532,718 B2 * 3/2003 Rayman ................. B65D 85/06 53/399

(Continued)

*Primary Examiner* — Dean J Kramer
(74) *Attorney, Agent, or Firm* — Chernoff Vilhauer LLP

(57) ABSTRACT

A load handler is capable of loading and unloading tall unitary resilient loads such as large construction tires or other tall compressible loads such as bales normally considered incompatible for shipment in standard closed-top containers, to enable such compatibility economically. The load handler has a pair of vertically spaced load clamping arms, the upper arm being capable of rotating such a resilient load selectively onto or off of the lower arm while the load is compressed between the load clamping arms.

4 Claims, 4 Drawing Sheets

(56) References Cited

U.S. PATENT DOCUMENTS

| | | | | |
|---|---|---|---|---|
| 8,061,942 | B2 | 11/2011 | Fennell | |
| 8,434,778 | B2 | 5/2013 | Ehrlich et al. | |
| 8,449,240 | B2 * | 5/2013 | Priepke | A01D 87/127<br>414/704 |
| 2010/0187846 | A1 * | 7/2010 | Crezee | B25J 15/0004<br>294/115 |

* cited by examiner

LOAD HANDLER FOR LOADING AND UNLOADING TALL RESILIENT UNITARY LOADS IN HEIGHT-RESTRICTING CONTAINERS

BACKGROUND OF THE INVENTION

Tall resilient unitary loads, such as large deformable tires for construction vehicles, or other large deformable approximately cylindrical loads such as straw bales, have previously been transported in tall vertical orientations either in a vertically uncompressed condition, as exemplified by U.S. Pat. Nos. 8,061,942 and 8,434,778, or in a vertically compressed condition as exemplified by U.S. Pat. No. 6,532,718.

A problem with the foregoing vertically uncompressed condition is that the tall height of the unitary load can prevent its insertion into commonly-used standard closed-top cargo-carrying containers. Such vertically uncompressed condition can also interfere with the load's passage under low-overhead obstacles.

Conversely, the foregoing vertically compressed condition presents a difficult problem of increased cost of time and machinery necessary to compress and then insert tall unitary loads into a closed-top cargo-carrying container prior to travel, and later decompress and remove the load from the container upon arrival at its destination.

Accordingly what is needed is an economical and effective system which can quickly vertically compress and insert tall resilient unitary loads into a standard closed-top cargo-carrying container having a lower interior height than the height of the uncompressed loads, and later quickly extract the compressed loads from their containers at their delivery destinations.

DETAILED DESCRIPTION OF PREFERRED EMBODIMENTS

A novel type of load handling clamp assembly is exemplified herein for compressing, loading and unloading of tall resilient unitary loads, such as large deformable tires for construction vehicles or other large deformable approximately cylindrical loads such as straw bales, by resiliently deforming them into curved shapes capable of being efficiently loaded, transported and unloaded in standard closed-top cargo-carrying containers having restricted heights normally unsuitable for transporting such tall loads. Although the particular embodiment of the clamp assembly exemplified herein is mounted on a conventional load handling lift truck, it should be understood that lift truck mountability, while desirable, is not intended herein to exclude alternative possibilities of incorporating the novel load handling clamp assembly integrally into self-propelled vehicles such as Automated Guided Vehicles, or into stationary clamping machines.

FIGS. 1-11 show side, front and top views, respectively, of one nonexclusive example of a load handling clamp, generally indicated as 10, which satisfies the foregoing requirements of the improved system. It will be apparent to the skilled person that alternative variations of FIGS. 1-11 would also satisfy the foregoing requirements, and such variations are also intended to be covered hereby.

Figure 1:
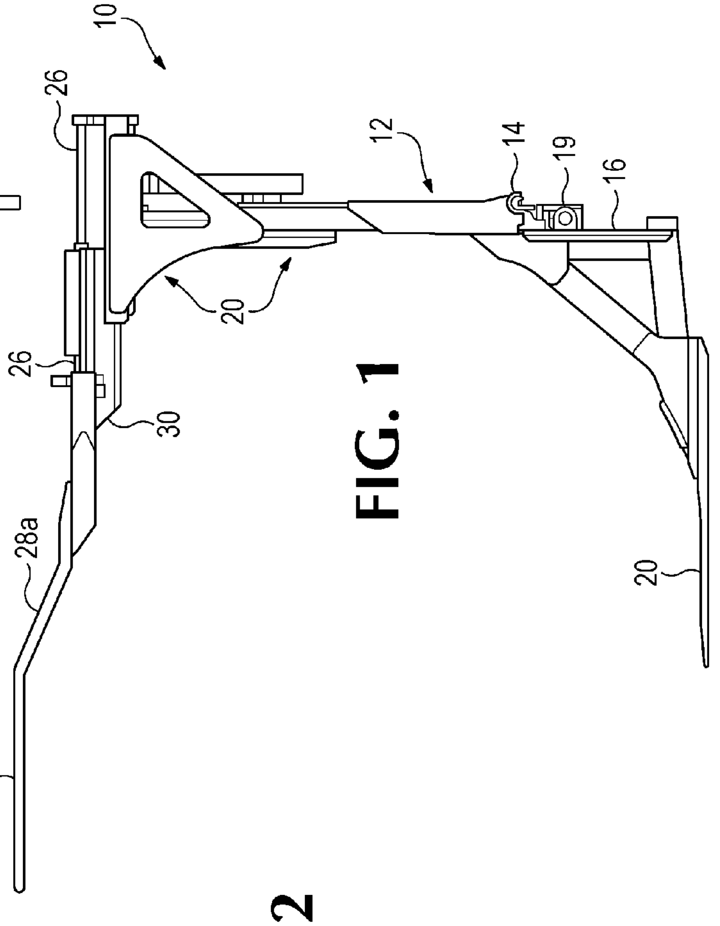
FIG. 1 is a side view of an example of a novel lift truck-mountable load handling clamp assembly, in accordance with the present invention, which is capable of satisfying the foregoing needs.
Figure 3:
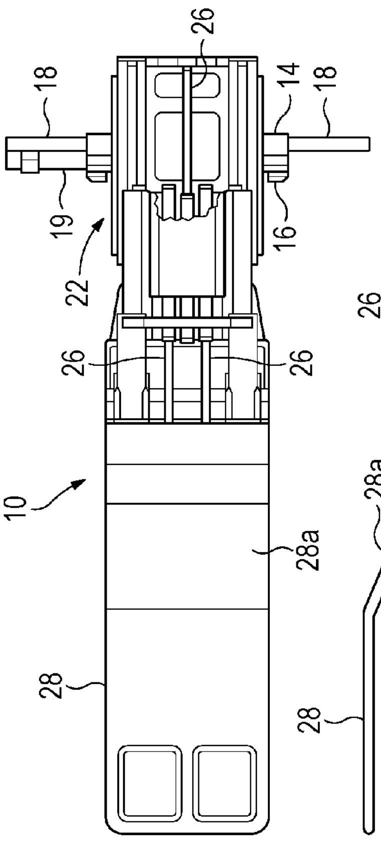
FIG. 3 is a top view of the exemplary clamp assembly of FIG. 1.
Figure 2:
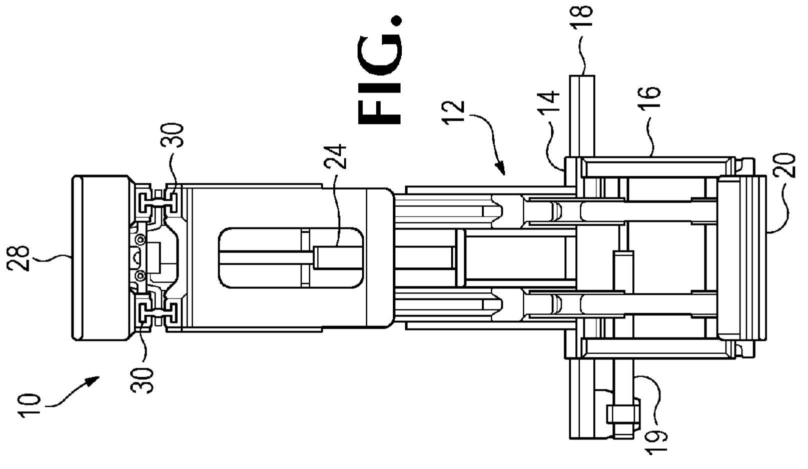
FIG. 2 is a front view of the exemplary clamp assembly of FIG. 1.

With reference to FIGS. 1-3, the foregoing load handling clamp 10 includes a load-supporting carriage assembly generally indicated as 12 which is preferably supported on a conventional load-handling lift truck (not shown) by a conventional downwardly-facing elongate slidable hook 14 of a transversely-slidable load-supporting carriage 16. The hook 14 and carriage 16 are slidable transversely on a slide member 18, which supports the carriage hook 14 as shown in FIGS. 2 and 3, in response to the selective extension or retraction of a side-shifting hydraulic cylinder 19 or other type of side-shifting actuator such a hydraulically or electrically-driven screw. It should be noted that hydraulically and/or electrically-driven actuators are considered to be interchangeable as actuators for purposes of the present invention.

The slide member 18 is supportably mounted on a conventional carriage of a lift truck (not shown) which can selectively raise or lower the entire carriage assembly 12 in a conventional hydraulic or electric manner in response either to a lift truck operator's manual command or automatically in response to lift truck programming, or a combination of both, as desired. The carriage assembly 12 preferably rigidly supports a lower forwardly-extending load clamping arm 20 as shown in FIGS. 1 and 2, which is selectively vertically movable in response to the lift truck's raising or lowering of the carriage assembly 12. The clamping arm 20 could also, or alternatively, be vertically pivotally supported on the carriage assembly 12 if desired.

With further reference to FIGS. 1-3, protruding slidably upward from the carriage assembly 12 is an upper load clamping arm assembly, indicated as 22, which opposes the lower load clamping arm 20. The upper clamping arm assembly 22 is selectively vertically extensible and retractable with respect to the load-supporting carriage assembly 12 and lower load clamping arm 20 by a vertical hydraulic cylinder 24 as seen in FIG. 2. Also, at the top of the upper clamping arm assembly 22, multiple horizontally side-by-side hydraulic cylinders 26 are provided as seen in FIG. 3 to selectively horizontally extend or retract, in unison, an upper clamp arm 28 which is horizontally slidably supported on rail assembly 30. The upper clamp arm assembly 22 utilizes the side-by-side multiple horizontal cylinders 26 in order to provide a powerful horizontal linear extension and retraction capability of the upper clamping assembly, while minimizing its vertical space requirement and thrust resistance by means of a gradual vertically offsetting clamp arm section 28*a*. Thus the upper clamp arm 28 selectively slidably opposes the lower clamp arm 20 by means of the vertical hydraulic cylinder 24, and also is selectively extensible and retractable horizontally with respect to the lower clamp arm 20 by means of the multiple horizontal hydraulic cylinders 26 which must extend and retract the clamp arm 28 in the extremely limited space between the top of the load and the top of a closed-top container, as explained hereafter. The multiple horizontal cylinders 26 could alternatively be replaced by a typical telescopic cylinder arrangement.

Figure 4:
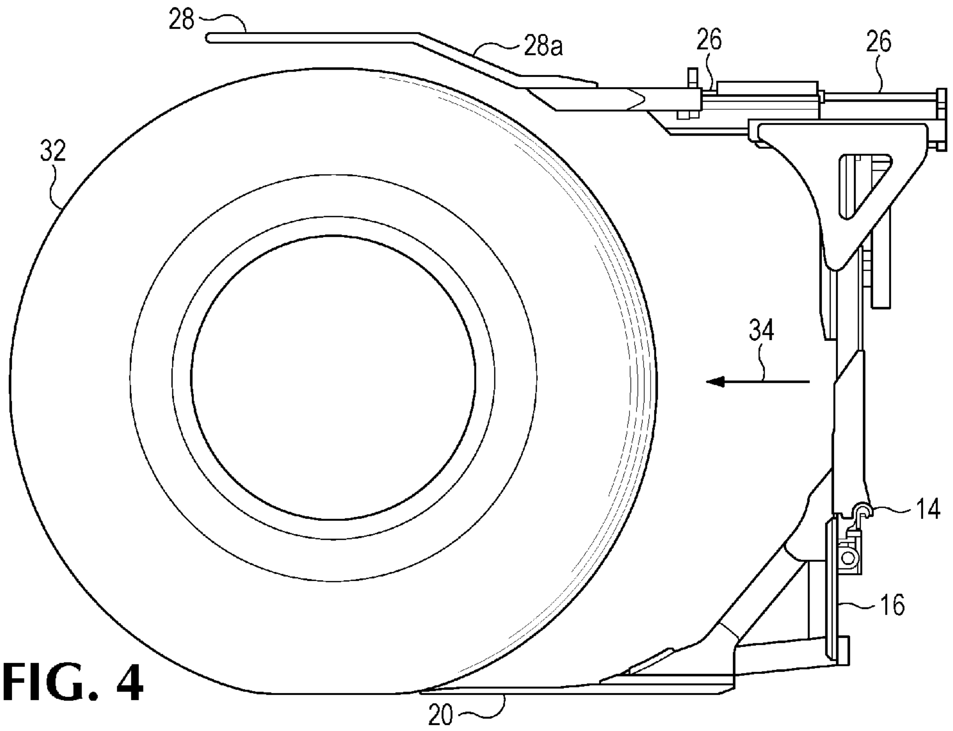
FIG. 4 is a side view of the exemplary clamp assembly of FIG. 1 shown preparing to engage an exemplary large-diameter resilient load in accordance with the present invention.

With reference to FIG. 4, in a typical loading operation a resilient unitary load, such as a tall deformable construction tire 32, can be approached along a direction 34 by a conventional lift truck upon which is mounted the above-described carriage 16 and its attached load handling clamp assembly 10. Prior to such approach, the clamp arms 20 and 28 will have been spread apart by the cylinder 24 such that they can encompass the load 32 as shown in FIG. 4, and the upper clamp arm 28, 28*a* will have been extended forwardly by the hydraulic cylinders 26 as also shown in FIG. 4. The lower face of arm 20 will have been lowered preferably so as to touch, or be very close to, the surface upon which the tire 32 or other type of load is supported.

Figure 5:
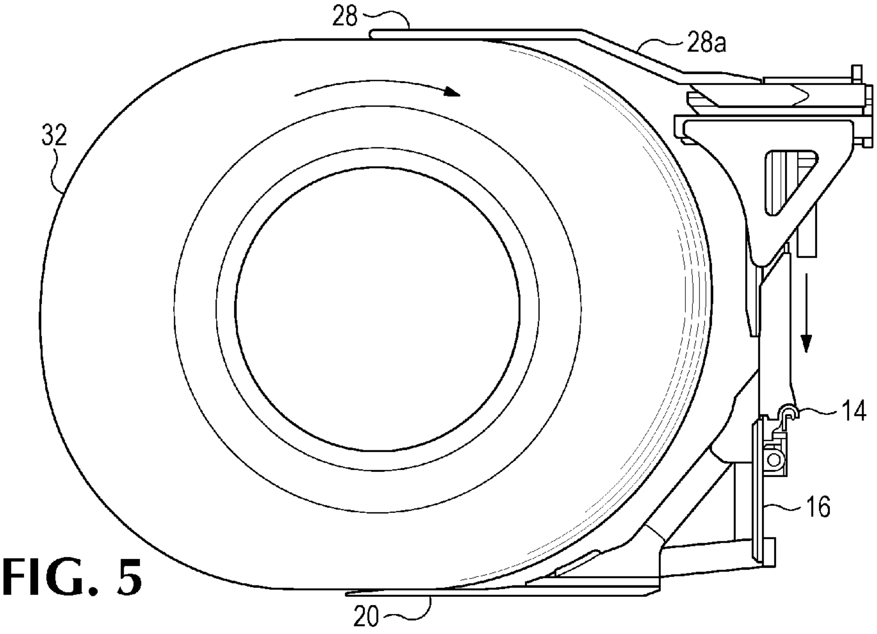
FIG. 5 is a side view of the exemplary clamp assembly of FIG. 1 shown vertically compressing the exemplary large-diameter resilient load of FIG. 4 and subsequently rotationally pulling the compressed load rearwardly toward the clamp assembly by horizontal retraction of the upper arm of the clamp assembly to more firmly grip the load.

Thereafter the forwardly extended upper clamp arm 28, 28*a* can be moved downwardly, by retraction of the cylinder 24, into contact with the top of the load 32 to compress it vertically, after which the hydraulic cylinders 26 can retract the upper clamp arm 28, 28*a* rearwardly thereby forcing the load to rotate clockwise as shown in FIG. 5. Such rotation rolls the load toward the carriage 16 thereby securing the load more positively between the clamp arms, while also increasing the lift truck's counterbalanced load-lifting capacity by moving the load closer to the lift truck's front axle.

Figure 6:
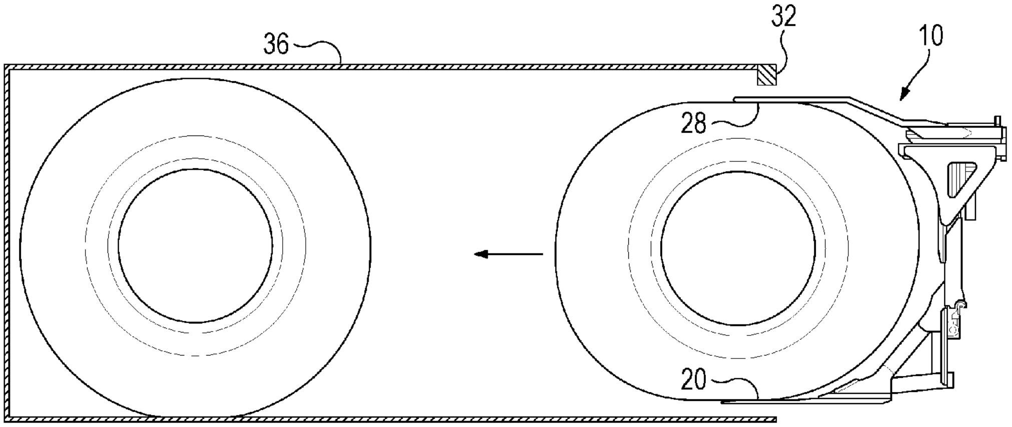
FIG. 6 is a simplified schematic side view of the load handler of FIG. 5 exemplifying its subsequent insertion of the compressed resilient load of FIG. 5 into a vertically restricted open end of an exemplary conventional closed-top cargo-carrying container.
Figure 7:
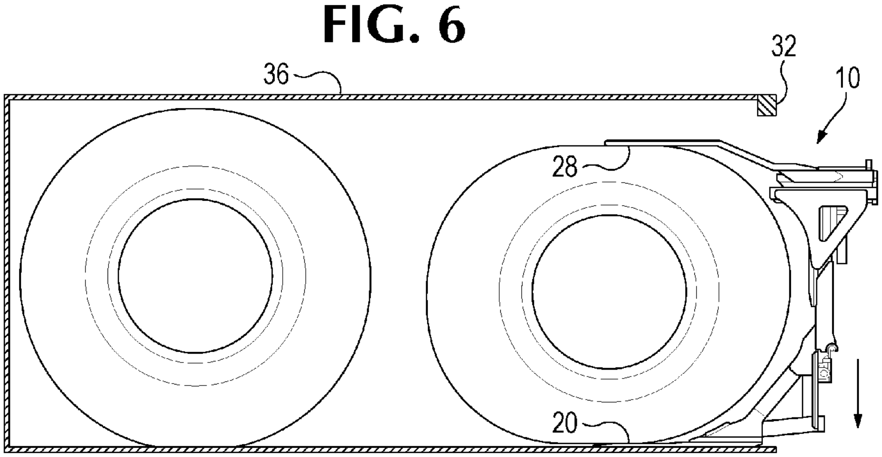
FIG. 7 exemplifies the load handler's subsequent deposit of the compressed load inside the open end of the container while still compressing the load.

Such vertical compression of the load continues until the load is compressed to a height, as exemplified in FIG. 6, whereby the top of the compressed load can fit below the horizontal roof beam or "header" 32 of a closed-top container 36 when lifted slightly by the lift truck to be inserted into the container 36 as shown in FIG. 6. Then the compressed load is lowered onto the container floor by the lift truck as shown in FIG. 7.

Figure 8:
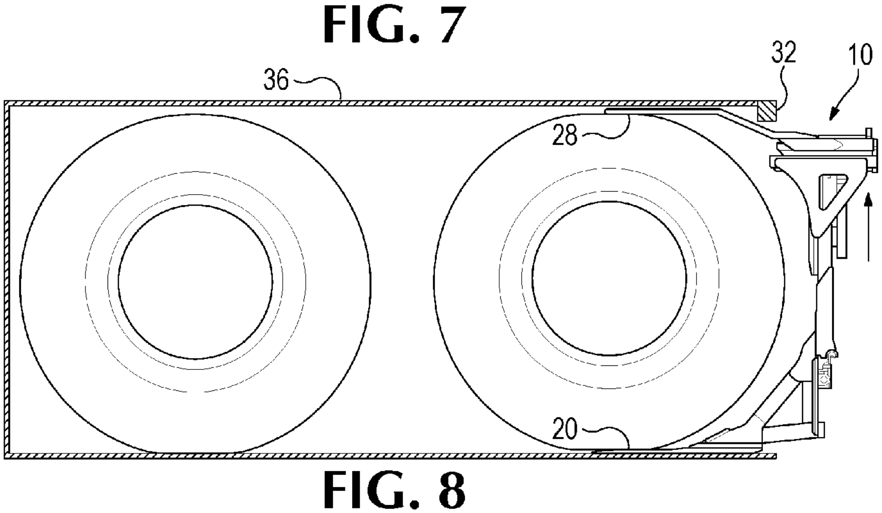
FIG. 8 exemplifies the load handler's subsequent partial decompression of the load inside the cargo-carrying container permitting the load to expand upwardly.
Figure 9:
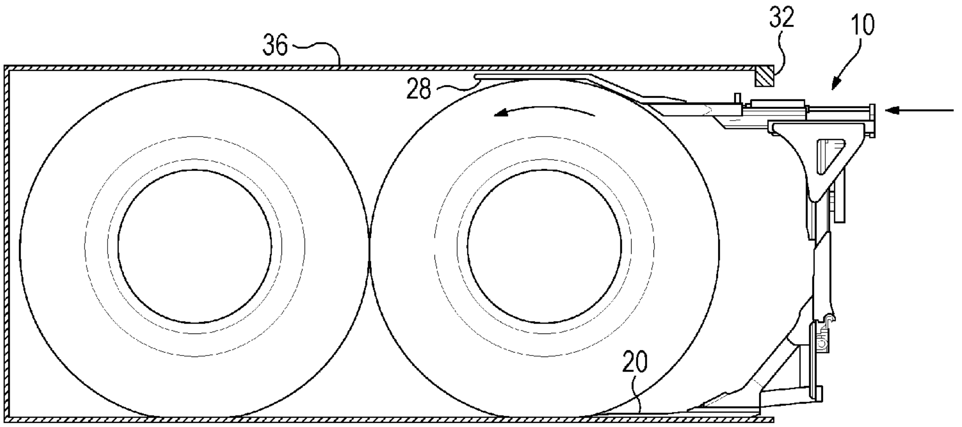
FIG. 9 exemplifies the load handler's subsequent rolling of the partially decompressed load further into the cargo-carrying container into contact with a previously-inserted load and releasing the load from the grasp of the load handler.

In FIG. 8, the upper clamp arm 28 is raised by the cylinder 24 and the load is thereby preferably permitted to expand partially within the container while retaining sufficient compression to frictionally engage the load to push the load forwardly into the container. Thereafter the load can be further rolled forwardly, if needed, by extension of the upper clamp arm 28 as shown in FIG. 9, thereby releasing the lower clamp arm 20 from beneath the load as also shown in FIG. 9 and facilitating subsequent retraction of the clamp arms from the load.

Figure 10:
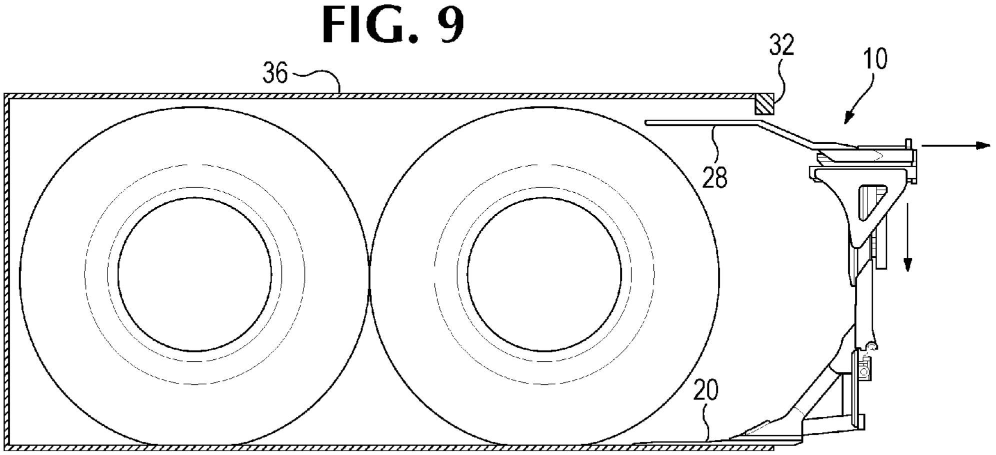
FIG. 10 exemplifies extraction of the load handler from the load.
Figure 11:
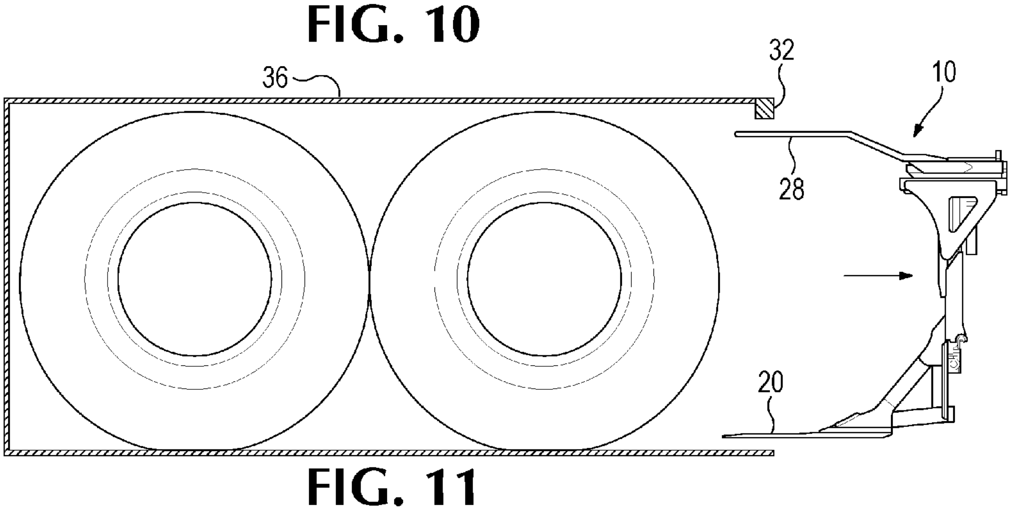
FIG. 11 exemplifies extraction of the load handler from the cargo-carrying container.

In FIG. 10, the upper clamp arm 28 is retracted from the roll and lowered by the cylinder 24 to below the top of the container opening defined by the bottom of the foregoing "header" 32 of the container. In FIG. 11 the clamp 10 is retracted from the container, enabling closing of the container and shipment of the load therein.

Unloading of the container at its destination is by means of a substantial reversal of the foregoing steps of FIGS. 4-11.

The terms and figures which have been employed in the foregoing specification are used therein as examples and not as limitations, and there is no intention, in the use of such terms and figures, of excluding equivalents of the features shown and described or portions thereof, it being recognized that the scope of the invention is defined and limited only by the claims which follow.

What is claimed is:

1. A load handler capable of selectively loading and unloading a resilient load relative to a load-supporting surface, said load handler comprising:

(a) a pair of opposed load-clamping arms extending in a substantially common direction, at least one of said load-clamping arms being selectively movable transversely to said common direction toward and away from the other of said load-clamping arms so that said arms can selectively engage or disengage said resilient load on respective opposed sides of said load and thereby vertically compress said resilient load;

(b) at least one of said load-clamping arms being selectively extensible and retractable relative to the other of said load-clamping arms substantially along said common direction so as to be capable of rotating said resilient load while said load is compressed by said pair of opposed load-clamping arms;

(c) wherein said one of said load clamping arms is located above said other of said load clamping arms and is capable of rotating said resilient load selectively onto or off of said other of said load-clamping arms while said load is compressed by said pair of opposed load-clamping arms.

2. The load handler of claim 1 wherein said load-clamping arms are capable of rotating said resilient load selectively in either of two opposite directions.

3. A load handler capable of selectively loading and unloading a resilient load relative to a load-supporting surface, said load handler comprising:

(a) a pair of opposed load-clamping arms extending in a substantially common direction, at least one of said load-clamping arms being selectively movable transversely toward and away from the other of said load-clamping arms so that said arms can selectively engage or disengage said resilient load on respective opposed sides of said load and thereby compress said resilient load;

(b) said load-clamping arms being capable of inserting said resilient load into a transportation container and rotating said resilient load while said load is inserted into said container and vertically compressed by said pair of opposed load-clamping arms;

(c) wherein said one of said load clamping arms is located above said other of said load-clamping arms and is capable of rotating said resilient load selectively onto or off of said other of said load-clamping arms while said load is compressed by said pair of opposed load-clamping arms.

4. The load handler of claim 3 wherein said load-clamping arms are capable of rotating said resilient load selectively in either of two opposite directions while said load is inserted into said container and compressed by said pair of opposed load-clamping arms.

* * * * *